United States Patent
Feindel et al.

(10) Patent No.: US 9,880,070 B2
(45) Date of Patent: Jan. 30, 2018

(54) ENGINE INSPECTION APPARATUS AND SYSTEM

(71) Applicant: United Technologies Corporation, Hartford, CT (US)

(72) Inventors: David T. Feindel, Ellington, CT (US); Steven D. Porter, Wethersfield, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 169 days.

(21) Appl. No.: 14/308,199

(22) Filed: Jun. 18, 2014

(65) Prior Publication Data

US 2014/0373610 A1 Dec. 25, 2014

Related U.S. Application Data

(60) Provisional application No. 61/837,946, filed on Jun. 21, 2013.

(51) Int. Cl.
*G01M 15/14* (2006.01)

(52) U.S. Cl.
CPC .................................. *G01M 15/14* (2013.01)

(58) Field of Classification Search
CPC .... F01D 21/003; F01D 25/24; F05D 2260/80; G01M 15/14; G02B 23/2476; G02B 23/2492
USPC ...................................................... 73/112.02
See application file for complete search history.

(56) References Cited

U.S. PATENT DOCUMENTS

| | | | | |
|---|---|---|---|---|
| 4,406,580 A * | 9/1983 | Baran, Jr. | ............. | F01D 21/003 415/118 |
| 4,470,735 A * | 9/1984 | Salisbury | ................ | F16B 39/28 411/272 |
| 4,815,276 A * | 3/1989 | Hansel | .................... | F01D 25/00 415/118 |
| 5,115,636 A * | 5/1992 | Zeiser | ................... | F01D 21/003 415/118 |
| 5,431,534 A * | 7/1995 | Charbonnel | .......... | F01D 21/003 415/118 |
| 5,867,976 A * | 2/1999 | Ziegler, Jr. | ............ | F01D 21/003 415/118 |
| 6,468,033 B1 * | 10/2002 | Weidlich | ................ | F01D 17/02 415/118 |
| 7,458,768 B2 * | 12/2008 | Dube | ...................... | F01D 17/02 415/115 |
| 7,685,826 B2 * | 3/2010 | McCooey | ............... | F01D 25/34 60/772 |

(Continued)

*Primary Examiner* — Freddie Kirkland, III
(74) *Attorney, Agent, or Firm* — Snell & Wilmer L.L.P.

(57) ABSTRACT

Inspection systems for a gas turbine engine (20) are provided. The inspection systems may comprise an inspection port (106), a bore-scope plug (100), a seal seat (108) and a seal (110A/110B). The bore-scope plug (100) may comprise a shaft (102A/102B) having a uniform or stepped profile. The seal (110A/110B) may be a multi-part seal (110A) or a piston seal (110B). Moreover, the bore-scope plug (100) may be configured to support, carry, and/or stabilize one or more internal structures such as, for example, a mid-turbine frame vane 82. In various embodiments, the inspection systems described herein may provide for increased inspection efficiency during development, qualification, maintenance, and event inspections.

25 Claims, 5 Drawing Sheets

(56) References Cited

U.S. PATENT DOCUMENTS

| | | | | |
|---|---|---|---|---|
| 8,047,769 | B2* | 11/2011 | Ballard, Jr. | F01D 17/02 |
| | | | | 415/118 |
| 8,061,972 | B2* | 11/2011 | Maier | F16J 13/12 |
| | | | | 415/118 |
| 8,197,187 | B2* | 6/2012 | Walker | F01D 25/24 |
| | | | | 415/118 |
| 8,439,630 | B2* | 5/2013 | Lemieux | F01D 21/003 |
| | | | | 356/241.1 |
| 9,200,538 | B2* | 12/2015 | Walker | F01D 25/24 |
| 9,494,052 | B2* | 11/2016 | Feindel | F01D 21/003 |
| 2010/0166537 | A1* | 7/2010 | Walker | F01D 25/24 |
| | | | | 415/118 |
| 2012/0282081 | A1* | 11/2012 | Walker | F01D 25/24 |
| | | | | 415/118 |
| 2013/0259646 | A1* | 10/2013 | Feindel | F01D 21/003 |
| | | | | 415/118 |

* cited by examiner

ENGINE INSPECTION APPARATUS AND SYSTEM

CROSS-REFERENCE TO RELATED APPLICATIONS

This application is a nonprovisional of, and claims priority to, and the benefit of U.S. Provisional Application No. 61/837,946, entitled "ENGINE INSPECTION APPARATUS AND SYSTEM," filed on Jun. 21, 2013, which is hereby incorporated by reference in its entirety.

FIELD

The present disclosure relates to engine inspection and more specifically access points for engine inspection.

BACKGROUND

Gas turbine engines typically require regular maintenance and inspection of internal components. Moreover, inspection of internal components often require significant effort if the gas turbine engine needs to be disassembled. Accordingly, the ability to inspect internal components without complete disassembly of the gas turbine engine provides for increased inspection efficiency.

SUMMARY

In various embodiments, a gas turbine inspection system may comprise a bore plug, a bore plug seat, a seal seat and a seal. The bore plug may comprise a shaft having a substantially uniform profile. The bore plug seat may comprise a wall. The wall may be defined by a through port providing access to an internal cavity of a gas turbine engine. The seal seat may be defined in the wall of the bore plug seat. The seal may be installable within the seal seat and configured to engage the bore plug.

In various embodiments, an engine inspection port may comprise a plug, a bore, and a seal. The plug may comprise a sealing portion. The bore may be configured to receive the plug. The bore may also define a seal aperture. The seal may be installable through the bore in the seal aperture. The seal may also be configured to engage the sealing portion.

In various embodiments, a turbine engine may comprise a housing, an inspection port, a plug, and a seal. The inspection port may be defined in an inspectable structure (e.g., a turbine vane). The inspection port may comprise a cylindrical wall defining an access channel. The wall of the inspection port may further define a seal slot. The plug may be removably installed in an access channel of the inspection port. The seal may be installable in the seal slot and configured to operatively engage the plug.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1:
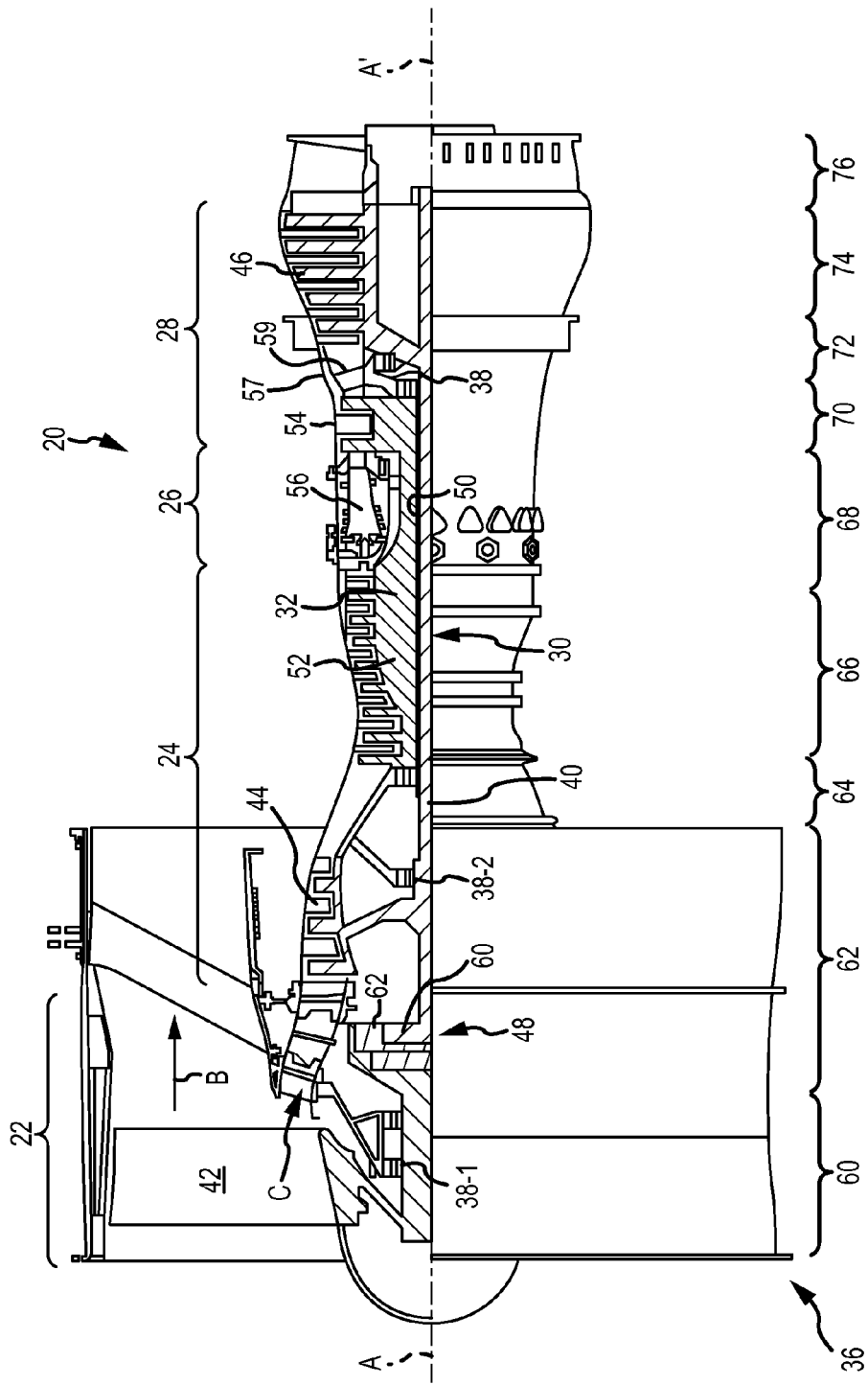
FIG. 1 is cross-sectional view of an exemplary gas turbine engine in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive air along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure (or second) compressor section 52 and high pressure (or second) turbine section 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Gear architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about 5:1. Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

With reference continued reference to FIG. 1, gas turbine engine 20 may generally include multiple of modules including for example, a fan case module 60, an intermediate case module 62, a Low Pressure Compressor (LPC) module 64, a High Pressure Compressor (HPC) module 66, a diffuser module 68, a High Pressure Turbine (HPT) module 70, a mid-turbine frame (MTF) module 72, a Low Pressure Turbine (LPT) module 74, and a Turbine Exhaust Case (TEC) module 76. In various embodiments any of these modules may include or be accessible through an inspection port. In this regard, any of the internal cavities of associated with the modules may be accessible through the inspection port, such that a bore scope or other suitable inspection device may in inserted in the cavity to inspect or check any suitable component or module. The inspection port may be used during development testing, qualification testing, during operation maintenance, as part of an operating anomaly inspection, and/or the like.

Figure 2:
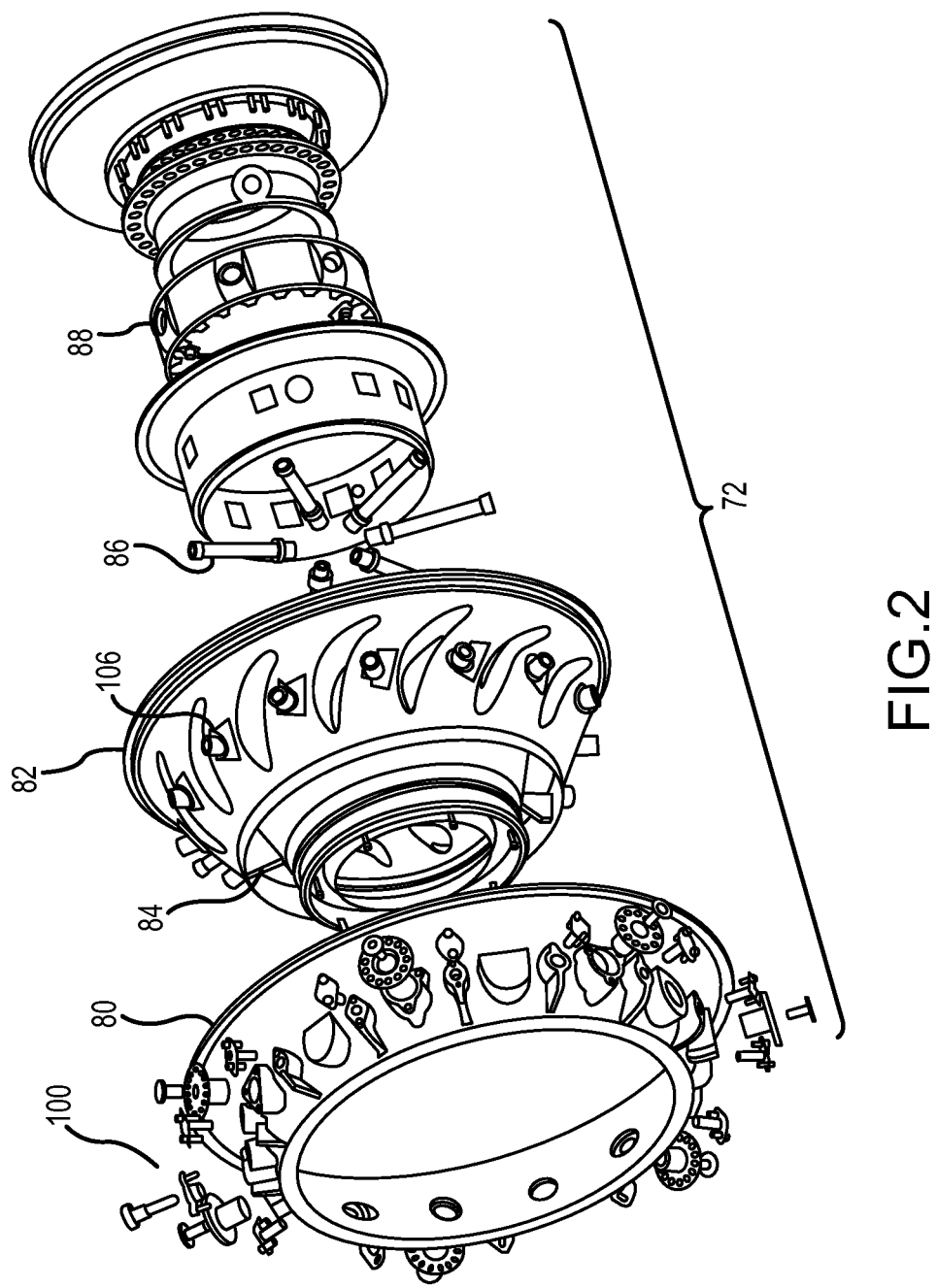
FIG. 2 is an exploded perspective view of an exemplary mid-turbine frame module in accordance with various embodiments.

For example and with reference to FIG. 2, MTF module 72 may generally comprise an outer turbine case 80, a mid-turbine frame vane (MTF vane) 82, multiple stators 84, multiple tie rods 86, and/or an inner case 88. In various embodiments, turbine case 80 and MTF vane 82 may be configured with and/or comprise one or more inspection port 106 (e.g., channels or ports defined in one or more turbine engine 20 structures such as, for example, turbine case 80. In this regard, one or more inspection ports 106 defined in turbine case 80 may provide access to the cavity between turbine case 80 and MTF vane 82.

In this regard, inspection port 106 may be configured to provide access to the internal cavity defined by MTF module 72 and/or engage or couple to a second access and/or maintenance cavity. One or more inspection ports 106 may define channels and/or ports that are configured to removably receive one or more bore-scope plug assemblies 100 (e.g., plugs, bore plugs, and/or the like). More specifically, inspection ports 106 may be configured to provide access to cavities associated with or adjacent to any airfoil, stator stage, rotating structures, such as for example, turbines (e.g., low pressure turbine 46 and/or high pressure turbine 54 shown in FIG. 1), gear assemblies (e.g., gear assembly 60 shown in FIG. 1), seals, and/or other components that require inspection and/or regular maintenance. Inspection port 106 also allows the cavity and/or component to be inspected without substantial disassembly of one or more cases, structures or components of gas turbine engine 20.

In various embodiments, MTF vane 82 may be installed within turbine case 80 and may surround in or more internal structures such as, for example, inner case 88. In this regard, MTF vane 82 may float between turbine case 80 and the internal structures. One or more plug assemblies 100 may be configured to center, hold, support, and/or carry MTF vane 82.

Figure 3:
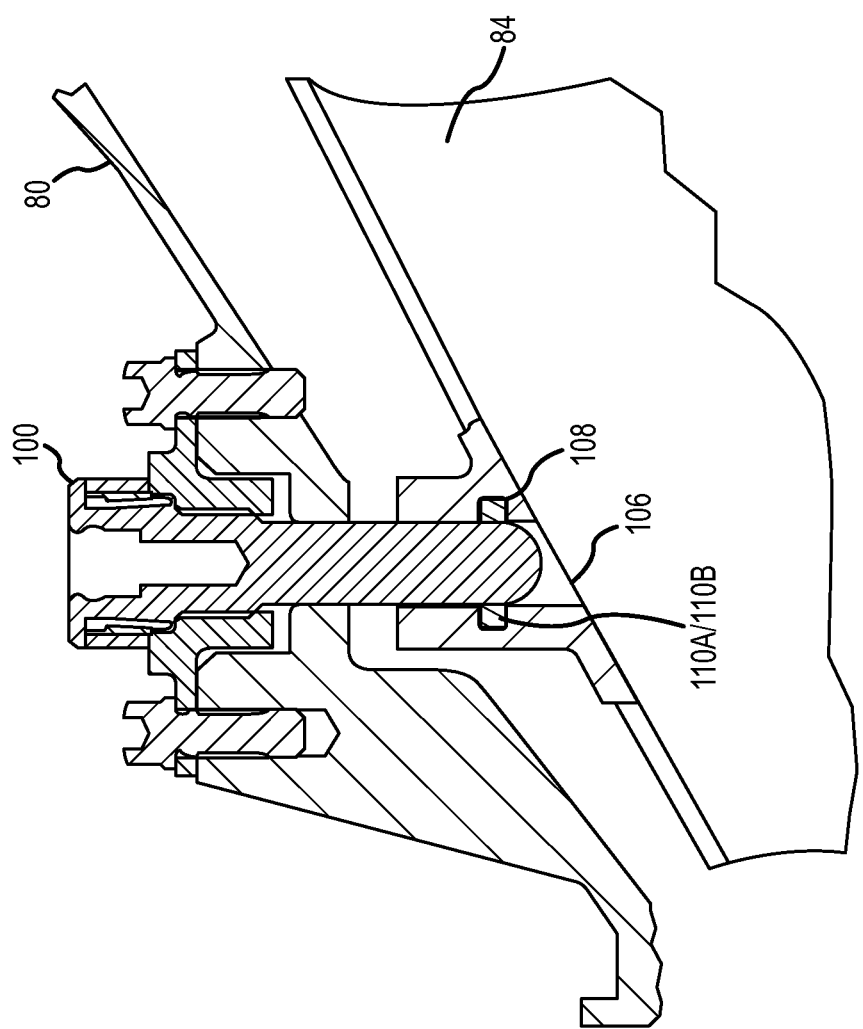
FIG. 3 is a cross-sectional view of a second portion of an exemplary mid-turbine frame module in accordance with various embodiments.

In various embodiments and with reference to FIG. 3, inspection port 106 (e.g., a bore plug seat, plug seat, bore-scope channel, inspection channel, and/or the like) may provide access through an external structural element (e.g., case 80) of gas turbine engine 20 (as shown in FIG. 1). Inspection port 106 may be coupled to or provide access to an internal cavity defined by an internal structure and/or any other suitable maintenance access channel. Inspection port 106 may be defined in an inspectable structure (e.g., MTF vane 82). As such, inspection port 106 may provide access to and/or through secondary structural channels that further provides access to internal cavities of gas turbine engine 20 and/or a component (e.g., inner case 88) or module (e.g., MTF module 72) of gas turbine engine 20.

In various embodiments, inspection port 106 may be configured with and/or define a seal seat 108 (e.g., a seal slot, a channel, groove, aperture, and/or the like). Seal seat 108 may be configured to retain and/or hold a seal. Seal seat 108 may be any suitable geometry. For example, the inner seat surface (with respect of centerline A-A') of seal seat 108 may be substantially flat. The outer seat surface of seal seat 108 may have a chamfer to facilitate installation of a seal through the channel defined by inspection port 106. The outer seat surface of seal seat 108 may also be substantially flat to improve manufacturing efficiency.

In various embodiments, a seal 110A/110B may be installed in seal seat 108 of inspection port 106. More specifically, seal 110A/110B may be retained in seal seat 108 and does not require additional structure (e.g., a bushing or sleeve) to entrap or hold seal 110A/110B. Seal 110A/110B may be installed in any suitable fashion. For example, seal 110A/110B may be pressed through the channel defined by inspection port 106 to seal seat 108, assembled in the seal seat 108, and/or installed in any other suitable fashion. Bore-scope plug 100 may also be removably installable in inspection port 106. In this regard, bore-scope plug 100 may be retained in any suitable fashion. For example, bore-scope plug 100 may be retained in inspection port 106 with fasteners, a tensioning mechanism, a locking mechanism, and/or the like.

Figure 4B:
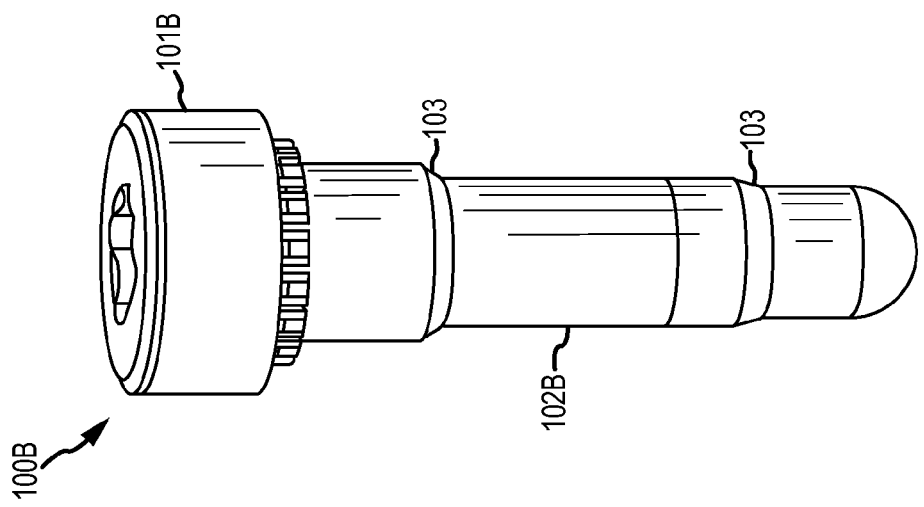
FIG. 4B is a perspective view of a bore-scope plug in accordance with various embodiments.
Figure 4A:
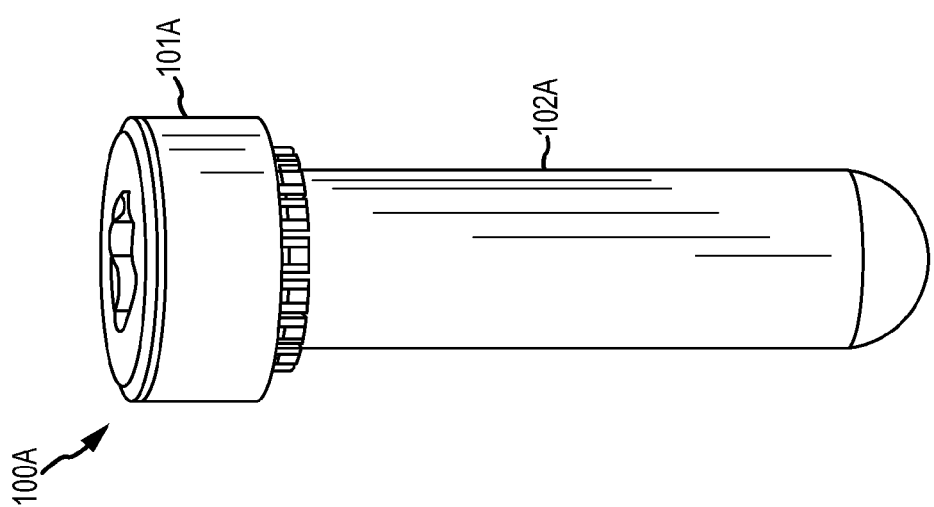
FIG. 4A is a perspective view of a bore-scope plug in accordance with various embodiments.

In various embodiments and with reference to FIGS. 4A and 4B, bore-scope plug 100 may be any suitable bore-scope plug such as, for example, bore-scope plug 100A/100B. Bore-scope plug 100A/100B may comprise a head 101A/101B and a shaft 102A/102B. For example and with specific reference to FIG. 4A, bore-scope plug 100A may comprise a shaft 102A with a substantially uniform profile. The profile may be any suitable shape. For example, the profile of bore-scope plug 100A may be substantially cylindrical. The profile of bore-scope plug 100A may also be substantially square, substantially rectangular, substantially elliptical, and/or any other suitable shape.

In various embodiments and with specific reference to FIG. 4B, shaft 102B of bore-scope plug 100B may comprise one or more steps 103 (e.g., shoulders). In this regard, bore-scope plug 100B may have a non-uniform profile and/or diameter. For example, each step 103 may facilitate a transition of diameter or a diameter change where bore-scope plug 100B has a generally cylindrical profile. Moreover, the profile of bore-scope plug 100B may be any suitable shape such as, for example, substantially square, substantially rectangular, substantially elliptical, and/or any other suitable shape.

In various embodiments and with reference to FIGS. 3 and 4A-4B, bore-scope plug 100A/100B may comprise a sealing portion. For example, bore-scope plug 100A/100B may comprise a particular region that is configured to engage and/or couple to seal 110A/110B, as shown in FIG. 3. Bore-scope plug 100A/100B may comprise a seal region along shaft 102A/102B (e.g., a portion of the shaft 102A/102B that has an outer diameter that is sufficient to engage the inner diameter of seal 110A/110B). For example, bore-scope plug 100B may be configured to engage seal 110A/110B at and/or on one of steps 103. In this regard, bore-scope plug 100B may be configured to exert an axial force (e.g., a sealing force) on seal 110A/110B (e.g., a force substantially perpendicular to centerline A-A' shown in FIG. 1). Bore-scope plug 100B may also be configured to engage seal 110A/110B at along a portion of shaft 102B between one or more steps 103. As such, bore-scope plug 100B may seat the seal on the inner seat surface of seat seal 108, as shown in FIG. 3. In various embodiments, seal 110A/110B may also be seal against shaft 102A/102B and/or seal seat 108 based on gravity or pressure from turbine engine 20.

Figure 5B:
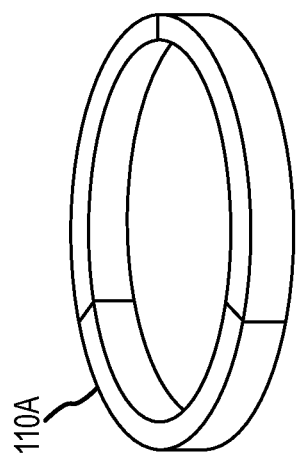
FIG. 5B is a perspective view of a seal in accordance with various embodiments.
Figure 5A:
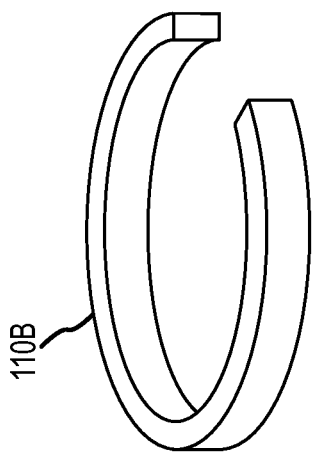
FIG. 5A is a perspective view of a seal in accordance with various embodiments.

In various embodiments and with reference to FIGS. 3 and 5A-5B, seal 110A/110B may be any suitable seal installable in inspection port 106 and configured to engage bore-scope plug 100. For example, seal 110A may be a multi-part seal comprising two or more pieces. Seal 110A may be installed and assembled in seal seat 108 of inspection port 106. Seal 110B may also be a piston seal. Seal 110B may be capable of being compressed, such that seal 110B is installable through inspection port 106 into seal seat 108.

Thus, in various embodiments, the inspection systems and apparatuses described herein may provide development, qualification, maintenance and inspection efficiency.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine inspection system, comprising:
   a bore plug comprising a shaft having a substantially uniform profile;

a bore plug seat defined by a wall of a mid-turbine frame vane, the wall defining a through port providing access to an internal cavity of a gas turbine engine, wherein the bore plug extends into the bore plug seat to support the mid-turbine frame vane;

a seal seat defined in the wall defining the through port, wherein the seal seat comprises at least one of a slot, a channel, a groove, or an aperture formed about a central portion of the wall and opening towards the bore plug, wherein the seal seat comprises an inner seat surface that is substantially flat relative to an engine centerline, wherein the seal seat comprises an outer seat surface that is substantially flat relative to the engine center line with the outer seat surface facing the inner seat surface; and a seal installable within the seal seat and configured to engage the bore plug.

2. The gas turbine inspection system of claim 1, wherein the seal is a multi-piece seal.

3. The gas turbine inspection system of claim 1, wherein the seal is a piston seal.

4. The gas turbine inspection system of claim 1, wherein the internal cavity is located adjacent to a turbine section.

5. The gas turbine inspection system of claim 1, wherein the uniform profile of the bore plug is substantially cylindrical.

6. The gas turbine inspection system of claim 1, wherein the internal cavity of the gas turbine engine is coupled to an internal cavity of the bore plug seat.

7. The gas turbine inspection system of claim 1, wherein the bore plug is configured to exert an axial force on the seal, and wherein the axial force is perpendicular to a centerline of the gas turbine engine.

8. The gas turbine inspection system of claim 1, wherein the seal seat comprises an inner seat surface that is substantially flat.

9. The gas turbine inspection system of claim 1, wherein an unstressed diameter of the seal is larger than a diameter of the through port.

10. The turbine engine of claim 1, wherein the bore plug is configured to support a turbine assembly.

11. An engine inspection port defined in a mid-turbine frame vane, comprising:

a plug comprising a sealing portion;

a bore formed in the mid-turbine frame vane and configured to receive the plug, the bore defining a seal aperture formed about a central portion of the bore and opening towards the plug, wherein the seal aperture is at least partially defined by a first surface and a second surface, wherein the first surface and second surface are separated by a radial distance relative to an engine centerline, wherein the plug is configured to support the mid-turbine frame vane; and a seal installable through the bore in the seal aperture and configured to engage the sealing portion of the plug.

12. The engine inspection port of claim 11, wherein the plug is removably installed in the bore.

13. The engine inspection port of claim 11, wherein the plug comprises a step.

14. The engine inspection port of claim 13, wherein the step is a portion of the sealing portion.

15. The engine inspection port of claim 14, wherein the step is configured to engage the seal.

16. The engine inspection port of claim 13, wherein the step is configured to engage the seal and exert an axial force on the seal relative to a centerline of a gas turbine engine.

17. The engine inspection port of claim 11, wherein the plug comprises a continuous uniform profile.

18. The engine inspection port of claim 11, wherein the seal is at least one of a multi-part seal and a piston seal.

19. The gas turbine inspection system of claim 11, wherein an unstressed diameter of the seal is larger than a diameter of the bore.

20. The turbine engine of claim 11, wherein the plug is configured to support a turbine assembly.

21. A turbine engine, comprising:

an inspection port defined in an inspectable structure, the inspection port comprising a cylindrical wall defining an access channel, the cylindrical wall further defining a seal slot formed about a central portion of the access channel remote from termini of the cylindrical wall;

a plug removably installed in an access channel of the inspection port with the seal slot opening towards the plug, wherein the plug is configured to support the inspectable structure; and a seal installable in the seal slot defined by the cylindrical wall and configured to operatively engage the plug installed in the access channel defined by the cylindrical wall.

22. The turbine engine of claim 21, wherein the plug comprises a sealing region and wherein the seal is configured to operatively engage the plug within the sealing region.

23. The turbine engine of claim 21, wherein the plug comprises at least one of a step and a continuous uniform profile.

24. The turbine engine of claim 21, wherein the plug is configured to support the inspectable structure.

25. The gas turbine inspection system of claim 21, wherein an unstressed diameter of the seal is larger than a diameter of the inspection port.

* * * * *